United States Patent [19]

Becker

[11] 4,265,631

[45] May 5, 1981

[54] AQUEOUS DYESTUFF PREPARATIONS OF WATER-INSOLUBLE OR SPARINGLY WATER-SOLUBLE DYES

[75] Inventor: Carl Becker, Basel, Switzerland

[73] Assignee: Ciba-Geigy Corporation, Ardsley, N.Y.

[21] Appl. No.: 60,425

[22] Filed: Jul. 25, 1979

[30] Foreign Application Priority Data

Aug. 2, 1978 [CH] Switzerland .......................... 8238/78

[51] Int. Cl.$^3$ .......................... D06P 1/56; D06P 1/58; D06P 1/613
[52] U.S. Cl. .......................... 8/471; 8/496; 8/527; 8/554; 8/552; 8/602; 8/648
[58] Field of Search .................. 8/2.5 A, 17, 18 R, 62, 8/88, 471, 496, 527, 554, 602

[56] References Cited

U.S. PATENT DOCUMENTS

| | | | |
|---|---|---|---|
| 3,090,762 | 5/1963 | Maeder et al. | 8/62 |
| 3,374,107 | 3/1968 | Cotton | 8/18 |
| 3,504,996 | 4/1970 | McMullen et al. | 8/17 |
| 3,853,459 | 12/1974 | Harper et al. | 8/18 |
| 3,873,265 | 3/1975 | Kleber et al. | 8/18 |
| 3,957,427 | 5/1976 | Chambers | 8/18 A |
| 3,977,828 | 8/1976 | Becker et al. | 8/2.5 A |
| 4,088,440 | 5/1978 | Leimbacher et al. | 8/2.5 R |
| 4,132,522 | 1/1979 | Fono et al. | 8/88 |

FOREIGN PATENT DOCUMENTS

| | | | |
|---|---|---|---|
| 2557002 | 11/1976 | Fed. Rep. of Germany | 8/2.5 A |
| 2757330 | 6/1978 | Fed. Rep. of Germany | 8/93 |
| 49-66975 | 6/1974 | Japan | 8/62 |
| 1403119 | 8/1975 | United Kingdom | 8/2.5 A |

*Primary Examiner*—Joseph L. Schofer
*Assistant Examiner*—Maria Parrish Tungol
*Attorney, Agent, or Firm*—Edward McC. Roberts

[57] ABSTRACT

Aqueous dyestuff preparation of water-insoluble or sparingly water-soluble dyes are used for the preparation of printing pastes for printing textile material and for printing carriers for transfer printing. These preparations contain at least 10% by weight of water, 25 to 60% by weight of a finely dispersed water-insoluble or sparingly water-soluble dye, 0.1 to 5% by weight of at least one water-soluble aminoplast precondensate, 0.5 to 5% by weight of a non-ionic copolymer of ethylene oxide with a further olefin, oxide said copolymer containing at least 65% by weight of ethylene oxide and having a molecular weight higher than 12,000, as well as, if desired or necessary, further nonionic ingredients.

32 Claims, No Drawings

AQUEOUS DYESTUFF PREPARATIONS OF WATER-INSOLUBLE OR SPARINGLY WATER-SOLUBLE DYES

The invention relates to novel aqueous dyestuff preparations of water-insoluble or sparingly water-soluble dyes, a process for the production of said dyestuff preparations, the use thereof for preparing printing pastes and the use thereof for printing supports for transfer printing, in particular for printing textile material or for dyeing textile material and also to the printed supports and the material printed by transfer printing or dyed or printed by a dyeing or printing process by means of these dyestuff preparations.

Water-insoluble or sparingly water-soluble dyes are available commercially both as liquid formulations and as powder formulations. The latter have the disadvantage that they have to be dispersed in water before they are applied. The known liquid formulations have the disadvantage that they usually contain large amounts, usually more than 30% by weight, of dispersants, and only about 20% by weight of dye.

It is known from German Offenlegungsschrift No. 2,520,527 that liquid dye preparations which have a high dye concentration and are stable on storage can be prepared when selected anionic dispersants are used together with non-ionic dispersants and hydrotropic agents, especially urea.

However, the use of urea or ionic hydrotropic agents in many cases has attendant disadvantages. Preparations which contain ionic hydrotropic agents cannot be used in electrolyte-sensitive application media, for example in those which contain polyacrylate thickeners, because their electrolyte content is too high. Preparations which contain urea as the hydrotropic agent undergo a change in the pH value on prolonged storage; this change results from the elimination of ammonia and can lead to partial decomposition in the case of alkali-sensitive dyes. Moreover, additional electrolyte is formed as a result of the elimination of ammonia. In the presence of urea there is also the danger with many thickeners that these will become brown or harden, so that they can be washed out only with difficulty. Moreover, owing to the evolution of ammonia, a dangerous excess pressure can arise in the hermetically sealed vessels in which the preparations are stored.

A further disadvantage of these known dyestuff preparations is their content of anionic dispersants which lower the viscosity of printing pastes which contain electrolyte-sensitive thickeners. This lowering of the viscosity has to be compensated for, where possible, by the addition of substantially larger amounts of these thickeners, which in turn impairs the subsequent washing off of the thickeners.

Accordingly, it is the object of the invention to provide dyestuff preparations of water-insoluble or sparingly water-soluble dyes that do not have the defects referred to above.

There have now been found dyestuff preparations with a substantially lower content of dispersants than hitherto which do not contain anionic dispersants, and which, surprisingly, form very stable dispersions. These novel dyestuff preparations contain a mixture of non-ionic dispersants consisting of an aminoplast precondensate and a copolymer of ethylene oxide with a further olefin oxide.

Because of the low content of dispersants, it is now possible to produce from the printing pastes obtained from the dyestuff preparations of the invention prints on textile material, which, after fixation at high temperature, no longer need to be given an afterwash, or need only be given a brief afterwash, thus affording substantial ecological and economic advantages. The resulting prints are immediately ready for use.

Unexpectedly, when the dyestuff preparations of the invention are used in printing pastes with synthetic thickeners, substantially higher degrees of fixation are obtained than with the previous conventional preparations on printing synthetic material, and, in addition, there is less migration of the dyes during drying.

Accordingly, the present invention provides novel aqueous dyestuff preparations with a low electrolyte content or containing no electrolytes of water-insoluble or sparingly water-soluble dyes having a particle size of less than $10\mu$, and in particular of less than $2\mu$, said preparations containing at least 10% by weight of water, 25 to 60% by weight of a finely dispersed water-insoluble or sparingly water-soluble dye, 0.1 to 5% by weight of at least one water-soluble aminoplast precondensate, and 0.5 to 5% by weight of a non-ionic copolymer of ethylene oxide and a further olefin oxide, said copolymer containing at least 65% by weight of ethylene oxide and having a molecular weight of more than 12,000, and also, if desired, further non-ionic ingredients.

Eligible water-insoluble or sparingly water-soluble dyes are, in particular, disperse dyes and vat dyes. The dyes belong to various classes, the disperse dyes being, for example, nitro dyes, aminoketone dyes, ketoneimine dyes, methine dyes, nitrodiphenylamine dyes, quinoline dyes, aminonaphthoquinone dyes, coumarin dyes and especially anthraquinone dyes and azo dyes, such as monoazo and disazo dyes.

Vat dyes are, for example, indigoid dyes, anthraquinonoid dyes, for example indanthrene, and also sulfur dyes and leuco vat dye esters.

Dyes are also to be understood as comprising fluorescent whitening agents. The latter are, for example, fluorescent whitening agents which are water-insoluble or sparingly water-soluble and belong to the following classes of compounds: stilbenes, coumarins, benzocoumarins, pyrenes, pyrazines, pyrazolines, oxazines, mono- or dibenzoxazolyl or -benzimidazolyl compounds, aryltriazole and v-triazole derivatives and naphthalic acid imides.

It will be understood that the type of dye will be largely determined by the desired colour shade and the field of application of the aqueous dyestuff preparations of the present invention.

If these preparations are employed, for example, to prepare printing pastes and for subsequent use in transfer printing, the water-insoluble or sparingly water-soluble dyes which are used are those which are suitable for the transfer printing process, especially disperse dyes which vaporise to at least 60% in less than 60 seconds at atmospheric pressure between 150° and 220° C. and which are stable to heat and can be transferred without decomposition.

If the preparations are employed, for example, to prepare printing pastes for printing textile material by direct printing, which is a preferred mode of application of the dyestuff preparations of the invention, or to prepare dyebaths for dyeing textile material, disperse dyes are used which have good dyeing and fixation characteristics and produce dyeings which are wetfast and fast to sublimation and light.

Moreover, it is also possible, within the scope of the definition, to employ mixtures of the same or different types of dye and also of fluorescent whitening agents in the aqueous preparations. Preferably, the preparations of the invention contain 35 to 50% by weight of dye or fluorescent whitening agent and, if possible, in a starting form with a low electrolyte content.

Suitable water-soluble aminoplast precondensates are condensation products which can be obtained by reaction of a carbonyl compound with a compound containing amino, imino or amide groups.

As carbonyl compounds there are preferably used aldehydes or ketones, e.g. acetaldehyde, propionaldehyde, n-butyraldehyde, isobutyraldehyde or crotonaldehyde, as well as glyoxal, chloral, acrolein, furfural, acetone, diethyl ketone, ethyl propyl ketone, cyclohexanone, and, in particular, formaldehyde.

Suitable compounds containing amino, imino or amide groups are e.g. acid amides, such as acetamide, propionamide, butyramide, urethanes, such as methyl-, ethyl- or propylurethane, sulfonamides, such as methane-, ethane-, propane- or butanesulfonamide, guanidine, sulfurylamide, cyanamide, dicyandiamide, thiourea or unsubstituted or substituted aniline, as well as preferably benzo- or acetoguanamine, melamine, and urea and urea derivatives, such as acetylene diurea, ethylene urea, propylene urea, oxethyl ethylene urea, or alkyl triazones, for example methyl or ethyl triazone. Of these compounds, the most preferred are urea and melamine.

The OH groups of the above aminoplast precondensates can be completely or partially etherified. The etherification can be carried out by reaction of the condensation products obtained from aldehyde or ketone and carbonyl compound with a lower alcohol, preferably methanol.

Particularly valuable aminoplast precondensates are the condensation products of formaldehyde with a urea derivative, benzo- or acetoguanamine, and, most particularly, urea and melamine, in which latter case at least 2 moles of formaldehyde per mole of urea or melamine are reacted. Preferably, the aminoplast precondensates are products in which electrolytes have been almost completely eliminated e.g. by reverse osmosis.

Examples of such particularly suitable aminoplast precondensates are: dimethylol melamine, hexamethylol melamine, pentamethylol melamine etherified with 2 to 3 moles or with 5 moles of methanol, dimethylol urea and tetramethylol urea.

It is also possible to employ mixtures of the above aminoplast precondensates.

The amount of aminoplast precondensate is 0.1 to 5%, especially 0.5-3%, by weight, based on the total weight of the preparation, or 2 to 10% by weight, preferably 3 to 6% by weight, based on the dye.

In addition to the water-soluble aminoplast precondensate, the preparations of the invention contain 0.5 to 5%, especially 1 to 3%, by weight, based on the weight of the preparation, or 2 to 10% by weight, preferably 3 to 6% by weight, based on the weight of the dye, of a non-ionic copolymer of ethylene oxide and a further olefin oxide, said copolymer containing at least 65% by weight, preferably at least 80% by weight, of ethylene oxide.

The olefin oxide is, for example: 1,2- or 2,3-butylene oxide, styrene oxide, 2,3-epoxyhexane, 1,2-epoxyhexane, 1,2-epoxyoctane, butadiene monoxide or cyclohexene monoxide, and especially propylene oxide.

Preferred copolymers are those of ethylene oxide and propylene oxide which have the formula

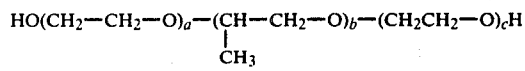

in which the sum of a and c is a number of at least 150 and preferably between 200 and 400 and b is a number between 20 and 100, preferably from 30 to 80.

Of these preferred copolymers, the following are particularly suitable for the process of the invention:

(a) copolymers of the formula indicated above, in which the sum of a and c is a number from 200 to 225 and b is a number from 60 to 80, (b) copolymers of the formula indicated above, in which the sum of a and c is a number from 280 to 320 and b is a number from 50 to 60, and (c) copolymers of the formula indicated above, in which the sum of a and c is a number from 220 to 280 and b is a number from 40 to 55.

If desired or necessary, further ingredients which improve the characteristics can be added to these dyestuff preparations, for example hygroscopic agents and antifrost agents, for example the polyols, ethylene glycol, monopropylene glycol, diethylene glycol, glycerol, sorbitol and others, or formamide; antimicrobial agents; fungicides, for example aqueous formalin solution; antifoams and viscosity improvers.

Preparations which are particularly stable on storage are those which contain at least 20% by weight of water, 25 to 60%, especially 35-50%, by weight of a finely divided disperse dye, 0.1 to 5%, especially 0.5-3% by weight of a water soluble aminoplast precondensate and 0.5 to 5%, especially 1-3%, by weight of a copolymer of ethylene oxide and propylene oxide containing at least 65% by weight of ethylene oxide, and or further non-ionic ingredients.

The aqueous dyestuff preparations of the present invention are obtained, for example, by mixing and grinding the dye in water with at least one of the said aminoplast precondensates and or non-ionic copolymer of ethylene oxide and a further olefin oxide, for example in a ball mill or sand mill, and adding the remaining components before, during or not until after the grinding process, to produce a preparation which has a particle size of less than 10µ and in particular of less than 2µ. Preferably, a mixture of dye and the indicated copolymer is ground first and then the aminoplast precondensate is added.

As the preparations of the invention have a low electrolyte content or contain no electrolytes, electrolyte-sensitive thickeners can now also be used to prepare printing pastes, which is not possible in the case of commercially available preparations of disperse dyes. In this connection, thickeners which have an especially valuable utility are, in particular, polyacrylic thickeners or copolymers of ethylene and maleic anhydride. A particularly suitable polyacrylic thickener is a mixture of a branched and a linear carboxymethylene polymer, preferably a mixture of a branched carboxymethylene polymer with a molecular weight of about 4,000,000 and a linear polymer with a molecular weight of about 500,000 to 1,000,000. The viscosity of these thickeners is not significantly lowered by the preparations of the invention, a fact which is of decisive importance in practice.

The dyestuff preparations of the invention are of low viscosity, have a low dispersant content and a low electrolyte content, are finely disperse and stable dispersions, i.e. they do not aggregate, and have a high concentration of dye. During both prolonged storage at 25° to 30° C. and after a storage of several weeks at 60° C. they remain stable i.e. their viscosity is low and they can be filtered with ease, and their viscosity changes only insignificantly. Thes state of fine division of the dyes remains virtually unchanged during storage. The preparations can be dispersed speck-free in textile printing inks with all conventional thickeners. On account of the high degrees of fixation which can be obtained with the preparations, no fixation catalysts are required when the preparations are used for direct printing on polyester material.

A very significant advantage when the preparations are used for direct printing on textile material is that the dyed material need not be given a washing-off or is given only a single washing-off with a small amount of water. This is because of the low content of dispersant, the possibility of using synthetic polyacrylic thickeners, and the high degree of fixation.

If the dyed material is given a washing-off, this can be effected with tetrachloroethylene instead of water, preferably at about 20°–25° C. It is advantageous to add to the tetrachloroethylene small amounts of a cleansing promoter, such as a tetraalkylammonium salt, for example dimethyldidodecylammonium chloride, a fatty acid amide condensation product or hexamethylphosphoric acid triamide, in an amount of about 1–10 g/l, preferably 2–5 g/l, with or without the addition of a small amount of water.

The preparations of disperse dyes obtainable up till now usually contain a small amount of dye alongside large amounts of dispersants, which have to be washed out after fixation of the dye—an operation which results in heavy pollution of the wastewaters.

The aqueous dye preparations of this invention are used to prepare aqueous, aqueous-organic or organic dye liquors or printing inks, or those based on a water-in-oil emulsion. Suitable aqueous-organic dye liquors or printing inks are e.g. those which contain water, isopropanol and/or n-propanol. They can contain additional constituents, for example cellulose acetate propionate.

These dye liquors or printing inks are suitable for dyeing or printing organic material, especially synthetic textile material, by a continuous or discontinuous procedure, for example material based on cellulose triacetate, synthetic polyamides and, in particular, polyesters. The dyeings can be produced by dyeing, padding or printing processes. The additives used in these processes are those customarily employed when applying disperse dyes to synthetic material. The material can be in very diverse stages of processing.

In the continuous dyeing of mixed fabrics of polyester and cellulose material, it is customary to use disperse dyes for the polyester and, inter alia, reactive dyes for the cellulose by one-bath single-stage processes. As is known, undesired reactions between ligninsulfonates in the disperse dye and the reactive dye occur and result in considerable reductions in the yield of the reactive dyeings and thus in problems with regard to the reproducibility of the dyeings and also in increased pollution of the wastewaters.

If, on the other hand, disperse dye formulations of the present invention are employed, the defects described are completely or substantially eliminated.

The dye preparations according to the invention can also be used for printing textile fabrics by transfer printing.

The transfer printing process is generally known and described in detail, for example, in French patent specification Nos. 1,223,330, 1,334,829 and 1,585,119. In this process, supports, which are printed with suitable printing inks, are brought into close contact with the substrate which it is desired to print, whereupon the dye is transferred from the support to the substrate under the action of heat and/or pressure.

Supports are planar structures, advantageously having a smooth surface, made of paper, cellophane, metal foils and the like, which are stable to heat and dimensionally stable (cf. British patent specification No. 1,190,889). Paper is the preferred support.

The aqueous preparations of the invention of transferable disperse dyes with a low content of electrolytes or containing no electrolytes have the significant feature that they can be dispersed both in purely aqueous printing ink systems and in aqueous-alcoholic printing ink systems to produce aggregate-free and stable dispersions.

Suitable transfer printing substrates are preferably planar structures such as fleeces, felts, carpets and, in particular, woven fabrics and knitted fabrics made of synthetic fibres.

If the novel preparations contain fluorescent whitening agents, they are used for whitening textile material by, for example, the exhaustion method, the high-temperature exhaustion method and the pad-heat method. If desired, further suitable diserpsants or other assistants can be added in order to stabilise the liquor and/or to obtain carrier effects.

A further use for the fluorescent whitening agent preparations of the invention is the whitening of spinning melts.

The following examples illustrate the invention without restricting it thereto. Parts and percentages are by weight. The temperatures are given in degrees Centigrade. Unless otherwise stated, the viscosities were measured at 20° C. using a LVT Brookfield viscometer with spindle 3 at 50 revolutions per minute (rpm).

The filtering properties of the dyes were determined with the aid of the following filter test:

200 ml of softened water are added to a weighed amount of grinding stock and the mixture is stirred intensively for 1 minute. The amount of grinding stock is such that the test dispersion contains 1 part per thousand of dye. The dilute dispersion is filtered on a porcelain suction filter through a 7 cm $\phi$ hard filter (Schleicher & Schüll filter 597) under a vacuum of about 25 torr. Easy filtration is possible with hard filter 597 only when the suspension contains dye particles which are essentially smaller than 5 microns.

EXAMPLE 1

450 parts of the disperse dye of the formula

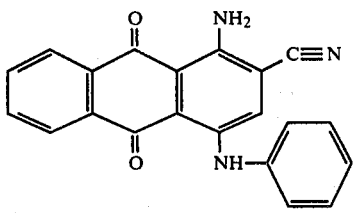

in the form of the dried crude dye which has been substantially freed from electrolytes were slowly stirred into a dispersing medium of the following composition:

30 parts of a non-ionic polycondensation product consisting of 20% of polypropylene oxide and 80% of polyethylene oxide and having a molecular weight of about 16,500, 30 parts of a 67% aqueous solution of an aminoplast precondensate prepared from 1 mole of melamine, 5 moles of formaldehyde and 2 to 3 moles of methanol, 300 parts of water, 170 parts of 1,2-propylene glycol and 20 parts of formaldehyde (preservative).

The dispersion is ground in stirred mill with 3000 parts of zirconium oxide grinding elements (diameter 1 mm) until the bulk of the dye particles have a primary particle size of less than $5\mu$. The time required to accomplish this is 20 hours. The grinding stock is separated from the grinding elements and deaerated. The dispersion has a viscosity of 280 cp (measured with a LVT Brookfield viscosimeter with spindle 2 at 30 rpm). The viscosity is increased to about 800 cp by addition of 0.1% of xanthan gum and stirring for several hours. The pH value is 7.9. The resulting product is an approximately 45% dyestuff preparation which remains fluid and can be filtered easily (filter test method as described above). The viscosity and degree of dispersion of this preparation change only insignificantly even after storage for several weeks at 60° C. or after storage for several months at changing room temperatures. The same result is obtained when the dispersion is ground in a bead mill or sand mill. The resulting dyestuff preparation is particularly suitable for the production of aqueous and partly aqueous printing inks for printing supports for transfer printing when using thickeners and binders which are sensitive to electrolytes.

By repeating the above procedure, but using the aminoplast precondensate alone instead of the mixture of 30 parts of non-ionic polycondensation product and 30 parts of aminoplast precondensate, then the viscosity increases so sharply while grinding that it is not possible to grind to completion.

A dye preparation which initially has similar properties is obtained by repeating the procedure described above exactly, but using only 30 parts of the non-ionic polycondensation product instead of the mixture of 30 parts of aminoplast precondensate and 30 parts of the non-ionic polycondensation product. However, after storage for several weeks at room temperature, but especially after storage for several days at 60° C., a distinct reduction in the filtering properties and the formation of a viscous sediment owing to the formation of aggregates can be determined.

EXAMPLES 2 TO 8

Each of the dyes of column 2 of the following table, in the form of the dry crude dye with a low electrolyte content, is stirred in the respective concentration indicated in column 3 with 3 parts of the non-ionic polycondensation product of Example 1, 3 parts of the same aminoplast precondensate as in Example 1, 17 parts of 1,2-propylene glycol, 2 parts of the preservative of Example 1 and the amount of water indicated in column 4. The dispersions are ground in closed ball mills (DYNOMILL, type KDL) with glass beads of 1 mm diameter until the bulk of the dye particles have a particle size of less than $5\mu$ and the filtering properties (determined in accordance with the above described test) are excellent. After adjusting to a viscosity between 400 and 800 cp by stirring in 0.1 to 0.2% of the xanthan gum of Example 1, dyestuff dispersions having an extremely good shelf life are obtained. The viscosity and filtering properties of these dyestuff dispersions change only insignificantly after storage for 14 days at 60° C. and subsequent storage at room temperature for 5 months.

On account of the absence of ionic dispersants, these dyestuff dispersions are suitable for obtaining alcoholic printing inks for gravure printing and flexographic printing on paper and also for the preparation of purely aqueous printing inks for gravure printing or rotary film printing on supports for heat transfer printing.

| Example | Disperse dyes | Parts by weight in the dispersion | |
|---|---|---|---|
| | | dye | water |
| 2 | 3-oxy-quinophthalone | 48 | 27 |
| 3 | 1-amino-2-phenoxy-4-oxyanthraquinone | 50 | 25 |
| 4 | 2-chloro-4-nitro-4'-oxyethyl-ethylamino-azobenzene | 45 | 30 |
| 5 | 1,4-diamino-2-methoxy-anthraquinone | 42 | 33 |
| 6 | 1,4-di-minomethylamino anthraquinone | 48 | 27 |
| 7 | 1-amino-4-anilido-anthraquinone | 45 | 30 |
| 8 | 1-oxy-4-p-toluidino-anthraquinone | 40 | 31 |

EXAMPLES 9–13

The procedure of Example 1 is repeated, but using instead of the 30 parts of aminoplast precondensate of Example 1 the same amount of one of the aminoplast precondensates listed in the following table. The resulting products are dyestuffs preparations having approximately identical properties, especially the same good shelf life, as the dyestuff preparation of Example 1.

| Example | Precondenstae obtained from | | | |
|---|---|---|---|---|
| | melamine (moles) | urea (moles) | formaldehyde (moles) | methanol (moles) |
| 9 | 1 | 1 | 7–8 | 7–8 |
| 10 | 1 | 0 | 5 | 5 |
| 11 | 1 | 0 | 5 | 5 |
| 12 | 1 | 0 | 3 | 1.5 |
| 13 | 1 | 0 | 6 | 6 |

EXAMPLE 14

417 parts of the disperse dye of the formula

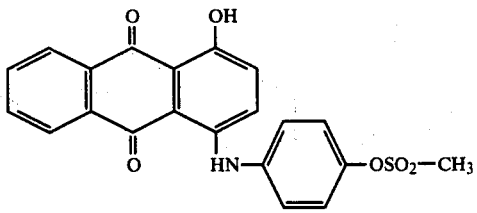

in the form of the dry crude dye which has been substantially freed from electrolytes, are stirred in a dispersing medium consisting of 333 parts of water, 170 parts of 1,2-propylene glycol, 20 parts of formaldehyde, 30 parts of the non-ionic polycondensation product and 30 parts of the aminoplast precondensate of Example 1. The dispersion is ground in a stirred mill with 3000 parts of zirconium oxide grinding elements until the bulk of the dye is reduced to a primary particle size of less than 5μ. The time taken to accomplish this is 16 hours. The viscosity of the suspension separated from the grinding elements is very low (175 cp) and has a pH value of 8.1. No change in viscosity occurs after storage for 14 days at 60° C. and no sediment forms on the bottom of the container. The originally excellent filtering properties of the suspension are fully retained after the storage at elevated temperature. The advantage of this liquid commercial formulation consists particularly in the fact it has an extremely low electrolyte content and therefore causes no significant changes in viscosity in synthetic printing ink thickeners which are highly sensitive to electrolytes.

EXAMPLE 15

450 parts of the disperse dye of the formula

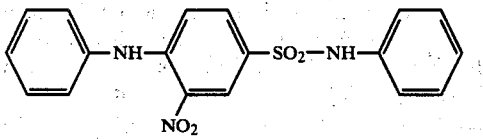

in the form of the washed and dried filter cake with a low electrolyte content are stirred together with 20 parts of the aminoplast precondensate of Example 9 and 20 parts of the non-ionic polycondensation product of Example 1 in a dispersing medium consisting of 170 parts of ethylene glycol, 5 parts of 35% formaldehyde solution and 335 parts of water, and the dispersion is ground in a ball mill with zirconium oxide grinding elements until the fineness of Example 1 is attained. A dispersion with a viscosity of 150 cp is obtained. This value remains unchanged even after storage for 14 days at 60° C. When thickened with 0.2% of a xanthan gum (Rodopol, Rhône-Poulenc), the viscosity of this preparation remains unchanged after storage for 7 months at room temperature and no viscous sediment forms. The filtering properties also do not change. Conventional printing ink thickeners into which this preparation is stirred remain completely speck-free. Dyestuff preparations which gel even during grinding or else on storage and which form distinct specks in printing ink thickeners are obtained by repeating the above procedure, but using 20 parts of the same aminoplast precondensate by itself or 20 parts of the non-ionic polycondensation product by itself instead of the mixture of 20 parts of aminoplast precondensate and 20 parts of the non-ionic polycondensation product.

EXAMPLES 16 TO 26

400 parts of the disperse dye of the formula

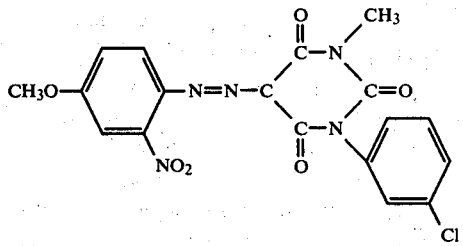

in the form of the washed and dried filter cake with a low electrolyte content are stirred together with 30 parts of the non-ionic polycondensation product of Example 1 in a dispersing medium consisting of 170 parts of 1,2-propylene glycol, 5 parts of formaldehyde and the amounts indicated in the following table of deionised water and aminoplast precondensate with a low electrolyte content of the composition described in the table. The dispersion is finely ground in the same manner as the dye of Example 14. The resulting liquid formulations have properties approximately identical to those of the dyestuff preparations of Examples 14 to 26, especially the same good shelf life. The dyestuff preparations of Examples 14 to 26 are most particularly suitable for dyeing and printing polyester woven and knitted fabrics in combination with the high-polymer synthetic thickeners which are extremely sensitive to electrolytes.

| Example | Amount of water | Amount of aminoplast pre-condensate | Aminoplast-precondensate consisting of | | | | | | | |
|---|---|---|---|---|---|---|---|---|---|---|
| | | | Melamine (moles) | Urea (moles) | Ethylene urea (moles) | Propylene urea (moles) | Formaldehyde (moles) | Glyoxal (moles) | Methanol (moles) | Isobutyraldehyde (moles) |
| 16 | 365 | 30 | — | 2 | — | — | 5 | — | 1-2 | — |
| 17 | 375 | 20 | — | 1 | — | — | 2 | — | — | — |
| 18 | 365 | 30 | 1 | — | 2 | — | 10 | — | 4 | — |
| 19 | 365 | 30 | 1 | 12 | — | — | 30 | — | 30 | — |
| 20 | 375 | 20 | — | 1 | — | — | — | 1 | 2-3 | — |
| 21 | 375 | 20 | 1 | 2 | — | — | 10 | — | 2-4 | 1 |
| 22 | 365 | 30 | — | 1 | — | — | 2 | 1 | — | — |
| 23 | 365 | 30 | — | 1 | — | 1 | 5 | — | 1 | 1 |
| 24 | 365 | 30 | — | 1 | — | — | 3 | — | 1 | 1 |
| 25 | 365 | 30 | — | 2 | — | — | 3 | — | — | — |
| 26 | 375 | 20 | 1 | — | 1 | — | 8 | — | 4-5 | — |

EXAMPLE 27

351 parts of the disperse dye of the formula

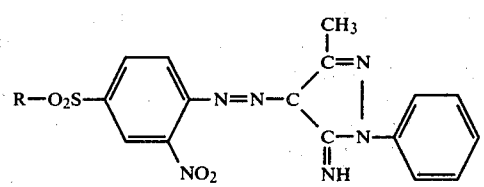

R = 50% CH₃, 50% C₂H₅ in the form of the dry crude dye which has been substantially freed from electrolytes are stirred together with 30 parts of the nonionic polycondensation product of Example 1, 30 parts of an aminoplast precondensate (water-soluble urea-formaldehyde condensation product), 170 parts of 1,2-propylene glycol, 7 parts of formaldehyde and 412 parts of water, and the dispersion is ground in a sand mill using Ottawa sand until the particle fineness of Example 1 is attained. The resulting formulation has a viscosity of 120 cp. A viscosity of about 800 cp is obtained by stirring in 0.15% of xanthan gum (Rhodopol, Rhône-Poulenc). The resulting fluid dyestuff preparation retains its excellent filtering properties even after storage for 14 days in a closed vessel at 60° C. or after storage for several months at room temperature. Admixture of this dyestuff preparation to a polyacrylic printing ink thickener (Carbopol, B. F. Goodrich Co.) yields a printing paste, the viscosity of which remains virtually unchanged.

If, on the other hand, a dyestuff preparation which has been prepared in known manner and has the following composition:

17.5 parts of the crude dye of the formula indicated above, 11.3 parts of a mixture of about 8.2 parts of a sulfite lignin with a ratio of carbon to organically bonded sulfur of 17:1 and consisting of 80% of molecules having a molecular weight between 4000 and 50,000, and about 3.1 parts of a sulphonated kraft-lignin with a ratio of carbon to organically bonded sulfur of 23:1, and consisting of 80% of molecules having a molecular weight between 1,000 and 30,000, 7.8 parts of a condensation product of naphthalenesulfonic acid and formaldehyde, 20.0 parts of ethylene glycol, 0.1 part of a preservative, 0.2 part of a xanthan gum and 43.1 parts of water, is added to a Carbopol printing ink thickener in an amount such that the same pigment concentration in the printing paste results, then the viscosity of the Carbopol printing paste is lowered to such an extent that the paste is unfit for use in practice.

EXAMPLE 28

300 parts of the disperse dye of the formula

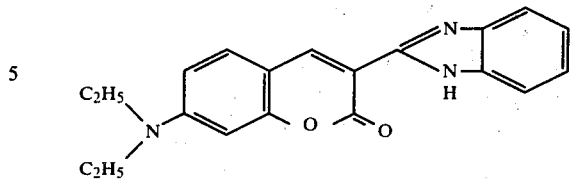

in the form of the dry crude dye which has been substantially freed from electrolytes are slowly stirred into a dispersing medium consisting of 480 parts of water, 170 parts of 1,2-propylene glycol and 30 parts of the non-ionic polycondensation product of Example 1. The dispersion is ground in a stirred mill with 3000 parts of zirconium oxide grinding elements (diameter 1 mm) until the bulk of the dye particles have a primary particle size of less than 5μ. This is accomplished after 22½ hours. Then 20 parts of the aminoplast precondensate of Example 18 are added and grinding is continued for a further hour, affording a dyestuff preparation which has excellent filtering properties and an exceedingly good shelf life.

EXAMPLE 29

400 parts of the disperse dye of the formula

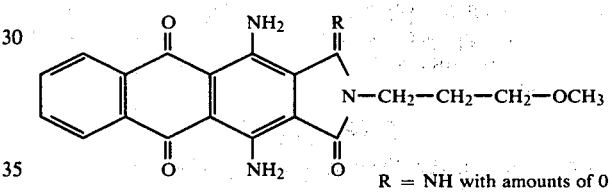

R = NH with amounts of O in the form of the dry crude dye which has been substantially freed from electrolytes are slowly stirred into a dispersing medium consisting of 380 parts of water, 170 parts of 1,2-propylene glycol and 30 parts of the non-ionic polycondensation product of Example 1. The dispersion is ground in a stirred mill with 3000 parts of zirconium oxide grinding elements (diameter 1 mm) until the bulk of the dye particles have a primary particle size of less than 5μ. This is accomplished after 22 hours. Then 20 parts of the aminoplast precondensate of Example 1 are added and grinding is continued for a further hour, affording a dyestuff preparation which has excellent filtering properties and an exceedingly good shelf life.

EXAMPLE 30

30 parts of the dyestuff preparation obtained in Example 29 are stirred into 970 parts of a 0.25% solution of a high molecular weight polyacrylic acid in distilled water (Carbopol 846, Goodrich) the pH of which has been adjusted to 6.8 with sodium hydroxide solution, and well homogenised. The resulting printing paste has a viscosity of 28,000 cp (LVT Brookfield viscometer, spindle 4, 6 rpm at 20° C.).

A polyester fabric is printed with this printing paste on a rotary gravure printing machine (roller printing). The printed fabric is then dried at 100°–140° C. and fixed for 8 minutes at 180° C. in high temperature steam.

In place of this HTS fixation, dry fixation (thermosol process) for one minute at 200°–210° C. can equally well be carried out.

After the fixation the goods are ready for use. Polyester prints which have a soft handle, high brilliance and optimum colour strength are obtained. The degree of fixation of the blue dye is more than 99%. It is therefore unnecessary to give the printed and fixed fabric a washing-off, because the handle and the fastness properties meet in full the requirements of practice.

A yellow print which has an equally good degree of fixation (>99%) is obtained by stirring in the same amount of the yellow dye formulated according to Example 15 instead of the abovementioned dye, and otherwise repeating the procedure described above. The viscosity of the printing paste is 26,500 cp.

If the abovementioned blue and yellow disperse dyes were to be formulated conventionally, i.e. as in Example 27, last paragraph, they could not be used in the process described above because the viscosity of the thickening system falls too sharply (<100 cp).

A printing paste with similarly good properties is obtained by repeating the above procedure, but using instead of 970 parts of polyacrylic acid solution the same amount of a 0.5% solution of a cross-linked copolymer of ethylene and maleic anhydride having a molecular weight of more than 500,000.

EXAMPLE 31

50 parts of the violet dye preparation obtained in Example 14 are stirred into 950 parts of a 0.3% solution of a high molecular weight polyacrylic acid in distilled water (Carbopol 846, Goodrich), the pH of which has been adjusted to 6.8 with sodium hydroxide solution, and thoroughly homogenised.

The resulting printing paste has a viscosity of 33,000 cp (LVT-Brookfield viscometer, spindle 4, 6 rpm at 20° C.).

A polyester woven or knitted fabric is printed with this printing paste on a rotary screen printing machine. It is then predried at 100°-140° C. and the dried woven or knitted fabric is fixed for 8 minutes at 180° C. in high temperature steam. Instead of this high temperature steam treatment, dry fixation for one minute at 200°-210° C. can also be carried out.

After fixation, the textile web is washed only briefly on a winchbeck or in a continuous washing machine at temperatures of 20°-50° C. Because of the good solubility of the thickener, the minimum amount of synthetic thickener employed and also the very small proportion of non-fixed dye can be removed from the fabric easily and rapidly in cold or lukewarm baths.

Brilliant, deep violet colour shades result which have good fastness to washing, water and rubbing. The degree of fixation of the dye is more than 98%.

When conventionally formulated, i.e. with an amount of anionic dispersant approximately corresponding to the amount of active dye ingredient, the same dye cannot be employed in the direct printing process described above because the viscosity of the printing paste falls to <100 cp owing to the introduction of too much electrolyte. Consequently, the paste is completely unfit for use and cannot be brought to the requisite viscosity even by the addition of more polyvinylcarboxylic acid (Carbopol).

The preparation obtained in Examples 15-29 can also be employed in the process described above instead of the dyestuff preparation obtained in Example 14. Deep prints with similarly good fastness properties are likewise obtained and again only one washing-off at low temperatures and/or with a small amount of wash liquor is necessary.

EXAMPLE 32

A fabric made of 67% of polyester and 33% of cotton is padded to a liquor pick-up of 60% using a liquor of the following composition: 80 g/l of the dyestuff preparation obtained in Example 15, 10 g/l of the dye of the formula

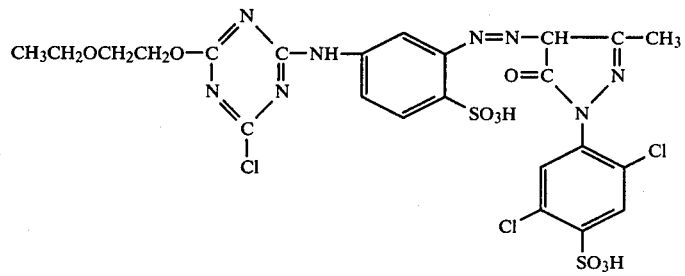

6 g/l of the dye of the formula

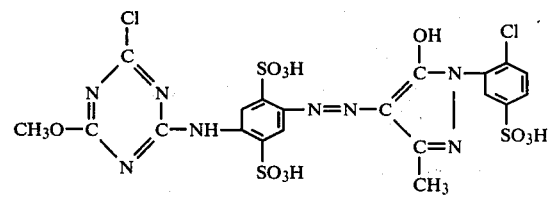

20 g/l of sodium bicarbonate, 100 g/l of urea, 5 g/l of borax and 10 g/l of a commercially available migration inhibitor based on an acrylic acid/acrylamide copolymer.

The fabric is then dried for 1 minute at 120° C. and the dyeing is fixed for 1 minute at 210° C.

Non-fixed dye is removed from the fabric by soaping at the boil with a liquor which contains, per liter, 1 g of an adduct of ethylene oxide and stearylamine and 2 g of sodium carbonate. The wash water contains only a small amount of dye and dispersant.

The fabric is dyed in a level yellow and, in particular, a perfect solid shade.

A very substantially lighter dyeing is obtained by repeating the procedure described above, but using instead of 80 g/l of the dye preparation obtained according to Example 15, a conventionally formulated dyestuff preparation which contains the same amount of dye but 36 g of an anionic dispersant based on ligninsulfonates instead of 3.2 g of the mixture of aminoplast precondensate and non-ionic polycondensation product.

An inadequate solid dyeing results since, on account of the interaction between the dispersant for the disperse dye and the reactive dye, the cotton is dyed in a very much lighter shade than the polyester. The wash water is considerably more deeply stained by the reactive dye linked to the ligninsulfonate.

EXAMPLE 33

A printing paste is prepared by stirring 7.5 parts of an aqueous dyestuff preparation obtained according to Examples 1–13 into 92.5 parts of a stock thickener which contains 0.4% of a high polymeric polyacrylic acid (Carbopol 846, B. F. Goodrich Co.) dissolved in water with the addition of ammonia to adjust the pH value to 7.1.

By stirring in the dyestuff preparations, the viscosity of the stock thickener changes from 30,000 cp to between 18,000 and 21,000 cp (Brookfield viscometer, spindle 4, 12 rpm), i.e. to a value which can be tolerated in practice.

Slightly diluted, this printing paste is applied to paper using a gravure printing machine or by screen printing or rotary screen printing. The paper is suitble for use in the transfer printing process on textile material, for example polyester material. Sharp level prints of excellent depth of shade are obtained.

If a preparation which contains the dye of Example 1 in conventional formation, i.e. with 50 to 100% of anionic dispersant (ligninsulfonate and/or naphthalene-/formaldehyde condensation product or other conventional anionic dispersants) is stirred into the stock thickener indicated above, then the resulting solution can no longer be used for printing, as the viscosity falls to about 70 to 80 cp (Brookfield viscometer, spindle 2, 30 rpm).

EXAMPLE 34

30 parts of a liquid 45% dyeing preparation formulated according to Example 12 are stirred into 500 parts of a stock thickener of the following composition and homogenised: 15 parts of sodium alginate thickener (Manutex F ®, Alginate Ind. Ltd.), 259 parts of water, 1 part of formalin, 150 parts of a 20% aqueous polyvinyl alcohol solution containing 10–17% of polyvinyl acetate as the copolymer component, and 75 parts of a 10% aqueous solution of a wetting and anti-foaming agent (containing nonyl-phenol diglycol ether sulfate, silicone oil and a solvent).

Finally, the mixture is diluted with water until the viscosity is about 15, measured with a Lefranc fluid meter.

This printing ink is printed onto a suitable paper web at a printing speed of 60 m/minute, using a Saueressig gravure printing machine, and dried.

After hot calendering for 35 seconds at a temperature of 210° C. in contact with a polyester woven or knitted fabric, an intense blue print of excellent general fastness properties is obtained on this fabric.

EXAMPLE 35

15 parts of the 48% dyeing preparation formulated according to Example 2 are diluted with 15 parts of a 1:1 mixture of desalinated water and denatured ethanol and introduced into 120 parts of a stock thickener of the following composition, with intensive stirring with an impeller: 78 parts of denatured ethanol, 24 parts of water and 3.6 parts of hydroxypropylcellulose (Klucel E, ®Hercules) dissolved therein, and also 14.4 parts of a 30% aqueous solution of a copolymer based on vinylpyrrolidone (Collacral ® VL, BASF).

The resulting quick-drying aqueous-alcoholic printing ink has a viscosity of 26" (Ford cup No. 4). The printing ink is deflocculated and has very good rheological properties in the printing chassis.

The prints obtained with this printing ink on a paper gravure printing machine with a cylinder engraved for halftone reproduction to a depth of 30 microns are faultless, i.e. they dry rapidly, adhere well and are free from bubbles.

If the printed side of the dried print is placed on a polyester satin fabric and treated for 30 seconds at 210° C. on a sheet press, a sharp-contoured deep yellow print is obtained which has good general fastness properties.

EXAMPLE 36

The procedure described in Example 18 is repeated, except that 30 parts of the preparation formulated according to Example 4, diluted with 10 parts of water and 10 parts of ethanol, are used and this mixture is stirred into 100 parts of the stock thickener. With an otherwise identical procedure, a print on polyester is obtained which has an intense deep purplish red shade having very good wet-fastness properties.

EXAMPLE 37

A paper web is printed by the flexographic printing process with a printing ink which consists of 10 parts of the dyestuff preparation obtained according to Example 5, 5 parts of water, 3 parts of a urea-formaldehyde resin, 60 parts of a 15% polyvinylbutyral resin solution (Mowital ® B3OH solution) in ethyl alcohol and 22 parts of ethyl alcohol.

The dyestuff preparation, prediluted with water, is stirred, with good turbulence, into the mixture, predissolved in ethanol, of urea-formaldehyde resin and polyvinylbutyral and homogenised very carefully.

This flexographic printing ink produces on transfer printing paper a print which is fast to rubbing and which can be transferred in a very high colour yield to a polyester woven or knitted fabric on a calender at a temperature of 200° to 210° C. within a contact time of 30 to 35 seconds. An intense, bluish red shade is obtained. The transferred design has very good wearing properties.

EXAMPLES 38–40

400 parts of the fluorescent whitening agent of the formula

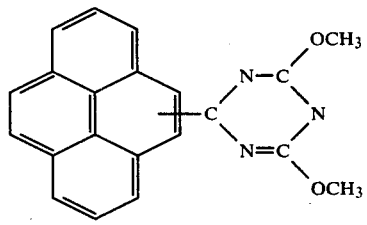

in the form of the aqueous filter cake are stirred with 40 parts of the non-ionic polycondensation product of Example 1, 100 parts of 1,2-propylene glycol, 5 parts of formaldehyde, the respective aminoplast precondensate in the amount indicated in the following table, and sufficient water to make up a batch of 1000 parts.

The batches are stirred in a bead mill for 7½ hours until the size of the individual fluorescent whitening agent particles has been reduced to less than 4μ, and the bulk of the particles is substantially less than 1 μm. The fineness of the dispersion is verified by means of a filtration test as described hereinbefore. In all experiments, the filtration times are less than 20 seconds. The filtering properties of the suspension are still as good after storage for 1 month at a temperature of 60° C.

| Example | Parts | Aminoplast precondensate |
|---|---|---|
| 38 | 20 | 1,3-dimethylol-4-methoxy-5,5-dimethylpropylene urea |
| 39 | 25 | condensation product of 1 mole of urea, 2.5 moles of formaldehyde and 0.05 mole of diethylene triamine |
| 40 | 20 | dimethyloldihydroxyethylene urea |

EXAMPLE 41

400 parts of the fluorescent whitening agent of the formula

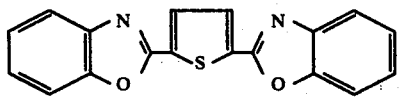

in the form of the dry filter cake are stirred with 40 parts of the non-ionic polycondensation product of Example 1, 30 parts of dimethylol urea, 100 parts of 1,2-propylene glycol, 6 parts of formaldehyde and 425 parts of water and finely ground in a vertical sand mill with Ottawa sand for 9 hours, so that the degree of fineness corresponds more or less to that of Examples 38–40. Storage for 14 days at 60° C. causes no appreciable change in the filtration time. This indicates that the suspension is very stable. The viscosity of the formulation also remains very low, as it does directly after the grinding procedure.

EXAMPLE 42

400 parts of the fluorescent whitening agent of the formula

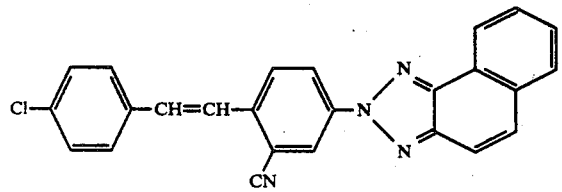

in the form of the dried filter cake are stirred with 40 parts of the non-ionic polycondensation product of Example 1, 50 parts of an aqueous solution containing 60% of pentamethylolmelamine pentamethyl ether, 100 parts of propylene glycol, 5 parts of formaldehyde and 405 parts of water and ground in the same manner and for the corresponding length of time as in Example 41. The resulting suspension has the same good shelf life at elevated temperature as the suspension of the fluorescent whitening agent of Example 41.

EXAMPLE 43

385 parts of the green vat dye of the formula

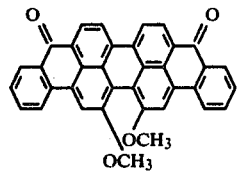

in the form of a 78% filter cake of low salt content are stirred in a mixture of 30 parts of aminoplast precondensate consisting of dimethylolethylene urea and methylolmelamine, 20 parts of the non-ionic polycondensation agent of Example 1, 100 parts of 1,2-propylene glycol, 5 parts of formalin and 460 parts of water. After deaeration, the slurry is ground with glass beads in a bead mill to a particle size substantially lower than 1 μm. The resulting excellent filtering properties and the very low viscosity of the suspension are also retained after storage for 3 weeks at +60° C.

EXAMPLE 44

With stirring, 200 g of the dyestuff preparation obtained in Example 1 are added to 1000 g of a mixture containing 41% of isopropanol, 41% of n-propanol, 8% of cellulose acetate propionate and 10% of water. The resulting printing ink is very suitable for printing paper for transfer printing in accordance with the procedure described in Example 35.

What is claimed is:

1. An aqueous dyestuff preparation of a water-insoluble or sparingly water-soluble dye having a particle size of less than 10μ, which contains at least 10% by weight of water, 25 to 60% by weight, of a finely dispersed water-insoluble or sparingly water-soluble dye, 0.1 to 5% by weight of at least one water-soluble aminoplast precondensate and 0.5 to 5% by weight of a non-ionic copolymer of ethylene oxide and a further olefin oxide, said copolymer having an ethylene oxide content of at least 65% by weight and a molecular weight of more than 12,000.

2. A dyestuff preparation according to claim 1, which contains 0.5 to 3% by weight of a water-soluble aminoplast precondensate and 1 to 3% by weight of a copolymer of ethylene oxide and a further olefin oxide.

3. A dyestuff preparation according to claim 1, which contains 35 to 50% by weight of a water-insoluble or sparingly water-soluble dye.

4. A dyestuff preparation according to claim 1, wherein the water-insoluble or sparingly water-soluble dye is a disperse dye or vat dye.

5. A dyestuff preparation according to claim 1, wherein the aminoplast precondensate is a condensation product of an aldehyde or ketone with a compound containing amino, imino or amide groups.

6. A dyestuff preparation according to claim 1, wherein the aminoplast precondensate is a condensation product of an aldehyde or ketone with a compound containing amino, imino or amide groups, in which the OH groups are completely or partially etherified.

7. A dyestuff preparation according to claim 6, which contains a condensation product in which the OH groups are completely or partially etherified by reaction with methanol.

8. A dyestuff preparation according to either of claims 5 or 6, wherein the water-soluble aminoplast precondensate is a condensation product of an aldehyde with urea, a urea derivative, melamine, benzoguanamine or acetoguanamine.

9. A dyestuff preparation according to claim 8, wherein the water-soluble aminoplast precondensate is a condensation product of formaldehyde with urea, a urea derivative, melamine, benzoguanamine or acetoguanamine.

10. A dyestuff prepartion according to claim 9, wherein the water-soluble aminoplast precondensate is a condensation product of formaldehyde with urea of melamine, in the reaction of which at least 2 moles of formaldehyde per mole of urea or melamine are used.

11. A dyestuff preparation according to claim 1, wherein the non-ionic copolymer is a copolymer of ethylene oxide and a further olefin oxide, said copolymer containing at least 80% of ethylene oxide.

12. A dyestuff preparation according to claim 1, wherein the copolymer of ethylene oxide and a further olefin oxide is a copolymer of ethylene oxide and propylene oxide.

13. A dyestuff preparation according to claim 1, which contains a copolymer of ethylene oxide and propylene oxide of the formula

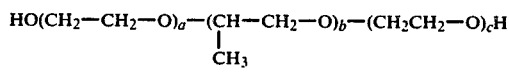

in which the sum of a and c is a number between 150 and 400 and b is a number between 20 and 100.

14. A dyestuff preparation according to claim 13, which contains a copolymer of the formula indicated in claim 13, in which the sum of a+c is a number from 200 to 225 and b is a number from 60 to 80.

15. A dyestuff preparation according to claim 13, which contains a copolymer of the formula indicated in claim 13, in which the sum of a+c is a number from 280 to 320 and b is a number from 50 to 60.

16. A dyestuff preparation according to claim 13, which contains a copolymer of the formula indicated in claim 13, in which the sum of a+c is a number from 220 to 280 and b is a number from 40 to 55.

17. A dyestuff preparation according to claim 1, which contains at least 20% by weight of water, 25 to 60% by weight of a disperse dye, 0.1 to 5% by weight of a water-soluble aminoplast precondensate, 0.5 to 5% by weight of a copolymer of ethylene oxide and propylene oxide, said copolymer containing at least 65% by weight of ethylene oxide.

18. A dyestuff preparation according to claim 18, which contains at least 20% by weight of water, 35 to 50% by weight of a disperse dye or vat dye, 0.5 to 3% by weight of a water-soluble aminoplast precondensate, 1 to 3% by weight of a copolymer of ethylene oxide and propylene oxide, said copolymer containing at least 65% by weight of ethylene oxide.

19. A dyestuff preparation according to claim 1, which contains the water-soluble aminoplast precondensate in an amount of 2 to 10% by weight based on the amount of dye.

20. A dyestuff preparation according to claim 1, which contains the non-ionic copolymer in an amount of 2 to 10% by weight, based on the amount of dye.

21. A process for the production of an aqueous dyestuff preparation according to claim 1, which comprises grinding the dye in water with the addition of at least one of the said water-soluble aminoplast precondensates or of one of the indicated copolymers and, if desired, adding the remaining components before, during of after the grinding process, to produce a preparation which has a particle size of less than $10\mu$.

22. A process according to claim 21, which comprises grinding the dye in water with the addition of a copolymer and subsequently adding an aminoplast precondensate.

23. A method of preparing printing pastes on an aqueous, organic or aqueous-organic basis or based on a water-in-oil emulsion, which comprises the use of an aqueous dye preparation according to claim 1.

24. A printing paste obtained according to claim 23.

25. A printing paste according to claim 24, wherein the thickener is a polyacrylic thickener or a copolymer of ethylene and maleic anhydride.

26. A printing paste according to claim 25, wherein the thickener is a mixture of a branched and a linear carboxypolymethylene polymer.

27. A printing paste according to claim 26, wherein the branched carboxypolymethylene polymer has a molecular weight of about 4,000,000 and the linear carboxypolymethylene polymer has a molecular weight of about 500,000 to 1,000,000.

28. A method of direct printing on textile material which comprises the use of a printing paste according to claim 23.

29. A method of producing dye liquors or printing pastes for dyeing or printing synthetic textile material, which comprises the use of an aqueous dyestuff preparation according to claim 1.

30. A method of printing supports with a sublimable dye suitable for transfer printing, comprising the steps of applying to the support a printing paste which is aqueous, organic, or aqueous-organic based, or is a water in oil emulsion, containing an aqueous dyestuff preparation of a water-insoluble or sparingly water-soluble dye having a particle size of less than $10\mu$, which contains at least 10% by weight of water, 25 to 60% by weight, of a finely dispersed water-insoluble or sparingly water-soluble dye, 0.1 to 5% by weight of at least one water-soluble aminoplast precondensate and 0.5 to 5% by weight of a non-ionic copolymer of ethylene oxide and a further olefin oxide, said copolymer having an ethylene oxide content of at least 65% by weight and a molecular weight of more than 12,000.

31. The method of claim 30, wherein the support is paper.

32. A printed support, obtained according to claim 30.